United States Patent
Li et al.

(10) Patent No.: US 10,102,006 B2
(45) Date of Patent: Oct. 16, 2018

(54) METHOD AND APPARATUS FOR CONTROLLING A STARTUP BOOTSTRAP PROGRAM OF AN INTELLIGENT TV SET

(71) Applicant: HISENSE ELECTRIC CO., LTD., Qingdao (CN)

(72) Inventors: Zengbo Li, Qingdao (CN); Jian Zuo, Qingdao (CN); Dejin Chu, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 109 days.

(21) Appl. No.: 15/388,045

(22) Filed: Dec. 22, 2016

(65) Prior Publication Data

US 2017/0102951 A1    Apr. 13, 2017

(30) Foreign Application Priority Data

Apr. 27, 2016  (CN) .......................... 2016 1 0269354

(51) Int. Cl.
  *G06F 9/44*    (2018.01)
  *G06F 13/42*   (2006.01)
  *G06F 9/4401*  (2018.01)

(52) U.S. Cl.
  CPC ........ *G06F 9/4401* (2013.01); *G06F 13/4282* (2013.01)

(58) Field of Classification Search
  CPC .......................... G06F 9/4401; G06F 13/4282
  See application file for complete search history.

(56) References Cited

U.S. PATENT DOCUMENTS

| 7,870,378 B2 * | 1/2011 | Kuo ................... G06F 11/1417 365/189.2 |
| 9,883,156 B2 * | 1/2018 | Zhou ...................... H04N 9/80 |
| 2017/0206851 A1 * | 7/2017 | Sun ...................... G09G 3/3696 |

FOREIGN PATENT DOCUMENTS

| CN | 1818868 A | 8/2006 |
| CN | 101207522 A | 6/2008 |
| CN | 103002343 A | 3/2013 |

(Continued)

OTHER PUBLICATIONS

Office Action from Chinese Application No. 201610269354.5 dated Apr. 13, 2018 (6 pages).

*Primary Examiner* — Stefan Stoynov
(74) *Attorney, Agent, or Firm* — Harness, Dickey & Pierce, P.L.C.

(57) ABSTRACT

Embodiments of the disclosure provide a method and apparatus for controlling a startup bootstrap program of an intelligent TV set, and relate to the field of an embedded system so as to shorten a period of time for startup boot while initializing a screen normally. In the disclosure, after a system is powered on, a first task of initializing a screen in a startup bootstrap program is executed, and the length of preset time required for executing the first task is obtained, wherein the startup bootstrap program is a bootstrap program for initializing pieces of software/hardware of the system; executing a second initialization task unrelated to initializing the screen in the startup bootstrap program is executed while the first task is being executed, thus addressing the problem in the related art.

18 Claims, 7 Drawing Sheets

(56) References Cited

FOREIGN PATENT DOCUMENTS

| CN | 103942104 | A  | 7/2014 |
|----|-----------|----|--------|
| EP | 1821207   | A1 | 8/2007 |

* cited by examiner

METHOD AND APPARATUS FOR CONTROLLING A STARTUP BOOTSTRAP PROGRAM OF AN INTELLIGENT TV SET

CROSS-REFERENCE TO RELATED APPLICATION

This application claims the benefit and priority of Chinese Patent Application No. 201610269354.5 filed Apr. 27, 2016. The entire disclosure of the above application is incorporated herein by reference.

FIELD

The present disclosure relates to the field of an embedded system, and particularly to a method and apparatus for controlling a startup bootstrap program of an intelligent TV set.

BACKGROUND

This section provides background information related to the present disclosure which is not necessarily prior art.

In an embedded system, the Boot Loader is such a segment of startup bootstrap program operating before an operating system comes to its operation that can take a software and hardware environment of the system to an appropriate state to thereby prepare for the operation of the operating system. The Universal Boot (U-Boot) Loader which is one of the most common Boot Loaders can boot a number of operating system, and support CPUs in a number of architectures.

While the U-Boot is being started, in order to prevent a screen from becoming blurred or darkened, tasks related to initializing the screen (e.g., a task of initializing a panel, a task of initializing a backlight board, etc.), and tasks unrelated to initializing the screen (e.g., a task of initializing a remote controller, a task of initializing a kernel, etc.) need to be loaded sequentially in a prescribed order, and after these tasks are executed, the system has been booted.

SUMMARY

This section provides a general summary of the disclosure, and is not a comprehensive disclosure of its full scope or all of its features.

Embodiments of the disclosure provide a method and apparatus for controlling a startup bootstrap program of an intelligent TV set so as to shorten a period of time for startup boot while initializing a screen normally.

An embodiment of the disclosure provides a method for controlling a startup bootstrap program of an intelligent TV set, the method including:

after a system is powered on, executing a first task of initializing a screen in a startup bootstrap program, and obtaining the length of preset time required for executing the first task, wherein the startup bootstrap program is a bootstrap program for initializing pieces of software/hardware of the system; and executing a second initialization task unrelated to initializing the screen in the startup bootstrap program while the first task is being executed.

An embodiment of the disclosure further provides an apparatus for controlling a startup bootstrap program of an intelligent TV set, the apparatus including at least one processor and a memory, wherein the memory stores therein instructions executable by the at least one processor, and the instructions are executed by the at least one processor to enable the at least one processor:

after a system is powered on, to execute a first task of initializing a screen in a startup bootstrap program, and to obtain the length of preset time required for executing the first task, wherein the startup bootstrap program is a bootstrap program for initializing pieces of software/hardware of the system; and to execute a second initialization task unrelated to initializing the screen in the startup bootstrap program while the first task is being executed.

An embodiment of the disclosure further provides a non-transitory machine-readable storage medium storing therein computer executable instructions including instructions for performing the method above for controlling a startup bootstrap program of an intelligent TV set.

As can be apparent from the technical solution above, the embodiments of the disclosure provide a solution to controlling a startup bootstrap program of an intelligent TV set, where the startup bootstrap program is executed by firstly executing a first task of initializing the screen, and then executing a second initialization task unrelated to initializing the screen while waiting for the execution of the first task. Thus it can be seen, in the embodiments of the disclosure, in order to shorten the overall time for startup boot, the other initialization task unrelated to initializing the screen can be performed while waiting for the execution of the first task of initializing the screen, thus shortening the time it takes to load the startup bootstrap program while initializing the screen normally.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

The disclosure can be applicable to various terminals including a screen (e.g., an intelligent TV set, an intelligent mobile phone, a tablet PC, etc.), and particularly terminals including an embedded system architecture (e.g., various terminals developed with Linux).

Figure 1:
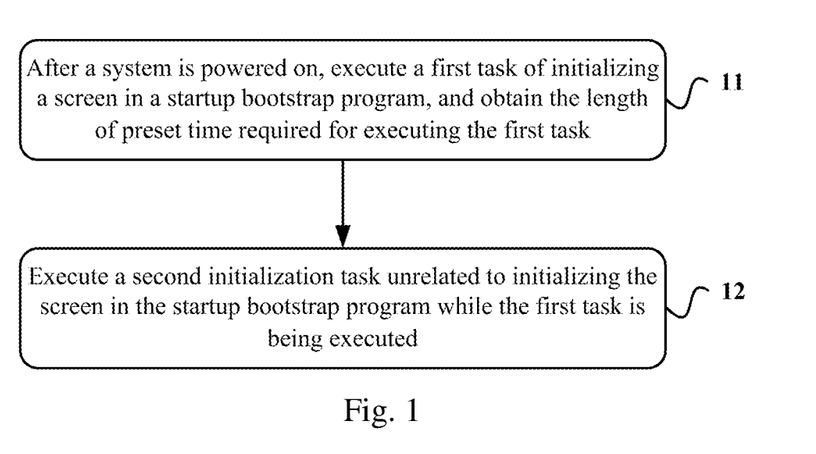
FIG. 1 is a schematic flow chart of a method for controlling a startup bootstrap program of an intelligent TV set according to some embodiments of the disclosure.

FIG. 1 illustrates a schematic flow chart of a method for controlling a startup bootstrap program of an intelligent TV set according to some embodiments of the disclosure, and as illustrated in FIG. 1, the flow can include the following steps:

The step 11 is, after a system is powered on, to execute a first task of initializing a screen in a startup bootstrap program, and to obtain the length of preset time required for executing the first task, where the startup bootstrap program is a bootstrap program for initializing pieces of software/hardware of the system.

The step 12 is to execute a second initialization task unrelated to initializing the screen in the startup bootstrap program while the first task is being executed.

In the step 11 and the step 12, respective tasks in the process of the startup bootstrap program are executed sequentially in the steps of: executing a task of initializing a panel; executing a task of transmitting a panel signal carrying image data of the initialization of the system; while starting executing the task of transmitting the panel signal, starting a preset timer, and executing a second initialization task unrelated to initializing the screen; after the timer counts to the obtained length of time required for executing the task of transmitting the panel signal, executing a task of initializing an I$^2$C interface of the screen; and executing a task of initializing a backlight board.

In the step 11 and the step 12, respective tasks in the process of the startup bootstrap program are executed sequentially in the steps of: executing a task of initializing a panel; executing a task of transmitting a panel signal carrying image data of the initialization of the system; executing a task of initializing an I$^2$C interface of the screen; while starting executing the task of initializing an I$^2$C interface of the screen, starting a preset timer, and executing a second initialization task unrelated to initializing the screen; and after the timer counts to the obtained length of time required for executing the task of initializing the I$^2$C interface of the screen, executing a task of initializing a backlight board.

In the step 11 and the step 12, respective tasks in the process of the startup bootstrap program are executed sequentially in the steps of: executing a task of initializing a panel; executing a task of transmitting a panel signal carrying image data of the initialization of the system; while starting executing the task of transmitting the panel signal, starting a preset timer, and executing a second initialization task unrelated to initializing the screen; after the timer counts to the obtained length of time required for executing the task of transmitting the panel signal, executing a task of initializing an I$^2$C interface of the screen; while starting executing the task of initializing an I$^2$C interface of the screen, restarting the preset timer, and executing a second initialization task, which is unrelated to initializing the screen and has not been executed; and after the timer counts to the obtained length of time required for executing the task of initializing the I$^2$C interface of the screen, executing a task of initializing a backlight board.

In the step 11 and the step 12, respective tasks in the process of the startup bootstrap program are executed sequentially in the steps of: executing a task of initializing a panel; executing a task of transmitting a panel signal carrying image data of the initialization of the system; while starting executing the task of transmitting the panel signal, starting a preset timer, and executing a second initialization task unrelated to initializing the screen; and after the timer counts to the obtained length of time required for executing the task of transmitting the panel signal, executing a task of initializing a backlight board.

In the step 11 and the step 12, if there is a second initialization task, which is unrelated to initializing the screen, and has not been executed, after the task of initializing the backlight board is executed, then the second initialization task which has not been executed will be further executed.

The disclosure as a whole has the following advantages:

Firstly the order in which the existing tasks related to initializing the screen are performed is not modified in the method according to the disclosure, and in a real application, the screen needs to be started normally by executing sequentially the task of initializing the panel, the task of transmitting the panel signal, the task of initializing the I$^2$C interface (where this task may not be executed), and the task of initializing the backlight board, where if the task of initializing respective pixels in the panel has not been finished, that is, only a part of the pixels are lightened, and the other part of the pixels are not lightened, then if the task of initializing the backlight board starts to be executed, then the screen tends to become blurred or darkened. In view of this, the respective tasks in the startup bootstrap program is categorized into two categories with the method according to the disclosure, where a first category relates to respective tasks of initializing the screen, i.e., first tasks; and a second category relates to respective tasks unrelated to initializing the screen, i.e., second tasks. In the disclosure, in order to initialize the pieces of hardware and software sequentially in the order prescribed in the industry standard, the respective tasks of initializing the screen needs to be executed sequentially; and furthermore in the disclosure, in order to execute sequentially the respective tasks of initializing the screen, the total length of time for executing the respective second tasks while the first tasks are being executed is no less than the total length of time required for executing the first tasks. Of course, other tasks of initializing the screen which have not been exemplified here shall also fall into the scope of the disclosure, so that the screen can be prevented from suffering from any software and hardware confliction, becoming blurred or darkened, etc., in the startup boot process in the disclosure.

Secondly, in the method according to the disclosure, the other initialization tasks unrelated to initializing the screen are executed while the currently tasks of initializing the screen are being performed, that is, the other initialization tasks unrelated to initializing the screen can be executed reasonably while the tasks related to initializing the screen are being executed in the disclosure, so that the respective pieces of underlying software/hardware are initialized normally in a period of time as short as possible, thus shortening the time it takes to load the startup bootstrap program.

The Android system is an operating system widely applicable to intelligent terminals, so the embodiments of the disclosure will be described taking an intelligent TV set, developed based upon Android (referred simply to as an intelligent TV set for the sake of a convenient description), merely as an example, but it shall be noted that the startup bootstrap program can be controlled in terminals developed based upon other systems under the same technical principle, although a repeated description thereof will be omitted here.

The key in the embodiments of the disclosure lies in that while U-Boot is being started, the preset timer is started to record a wait period of time required for initializing the screen, that is, in the embodiments of the disclosure, several important detection breakpoints, e.g., remote controller detection, kernel loading, kernel startup, etc., are added to the U-Boot starting process, and it is determined at each detection point whether the period of time recorded by the timer has been counted to a period of time for executing a next task of initializing the screen; and if the timer counts to the wait period of time required for executing the currently task of initializing the screen, then the next task of initializing the screen will be executed, and if the currently executed task is the last task of initializing the screen, i.e., the task of initializing the backlight board, then the initialization of the screen will have been finished, and the other tasks unrelated to initializing the screen will be further executed; otherwise, the screen will continue to be initialized. If the timer is still counting at the end of the U-Boot starting flow, then the state and the count of the timer will be passed to the kernel in a Tag (a Linux kernel passing parameter), and after the kernel is started, it is further determined at a detection point whether the period of time recorded by the timer has been counted to a period of time required for executing the current task, and it is further determined whether a next task unrelated to initializing the screen can be executed. Furthermore if a panel driver corresponding to the kernel is loaded, then a corresponding delay will be made using msleep (which is a delay function in the kernel) without affecting the startup process of the entire system any longer.

Based upon the technical idea above, the solution to controlling a startup bootstrap program, applicable to an intelligent TV set, has been described in details in the embodiments of the disclosure by way of an example. In a real application, a screen of some intelligent TV set may further include a specific Inter-Integrated Circuit ($I^2C$) interface, for example, if a piece of hardware of the screen can support a 1080P (ultra-high definition) display, then the intelligent TV set can further regulate the screen using internal software to support both a 1080 display and a 720P (high definition) display, and in this case, the $I^2C$ interface needs to be further initialized while the screen is being initialized, so that a display effect of the screen can be further regulated in response to a demand of the user, a network factor, etc. Some intelligent TV set does not support a display at a number of definitions, so it is not necessary to initialize the $I^2C$ interface while the screen is being initialized. In view of this, the solution above to controlling a startup bootstrap program will be exemplified below taking an intelligent TV set including an $I^2C$ interface, and an intelligent TV set including no $I^2C$ interface as examples, respectively.

Figure 2A:
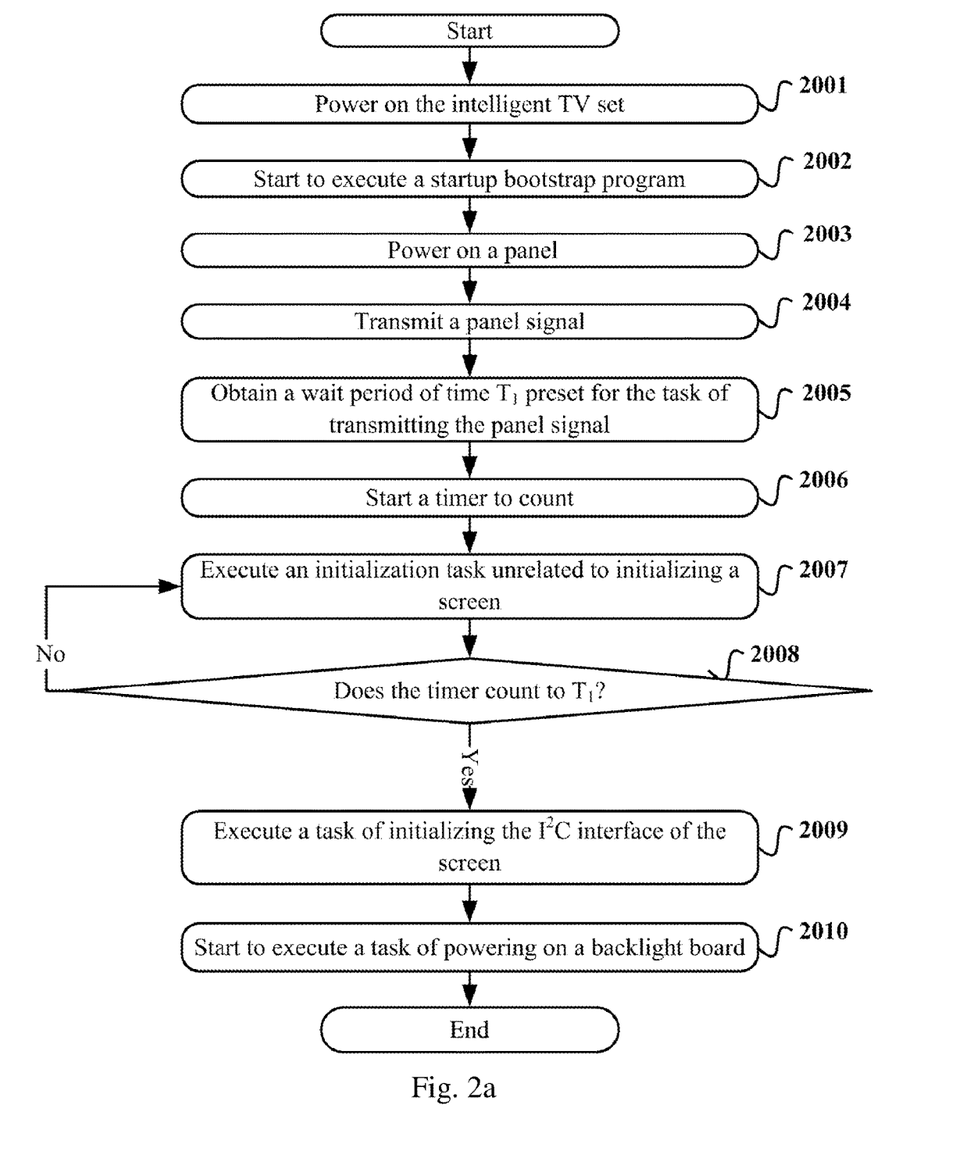
FIG. 2a is a schematic flow chart of a method for controlling a startup bootstrap program, applicable to an intelligent TV set including an I²C interface, according to some embodiments of the disclosure.
Figure 2B:
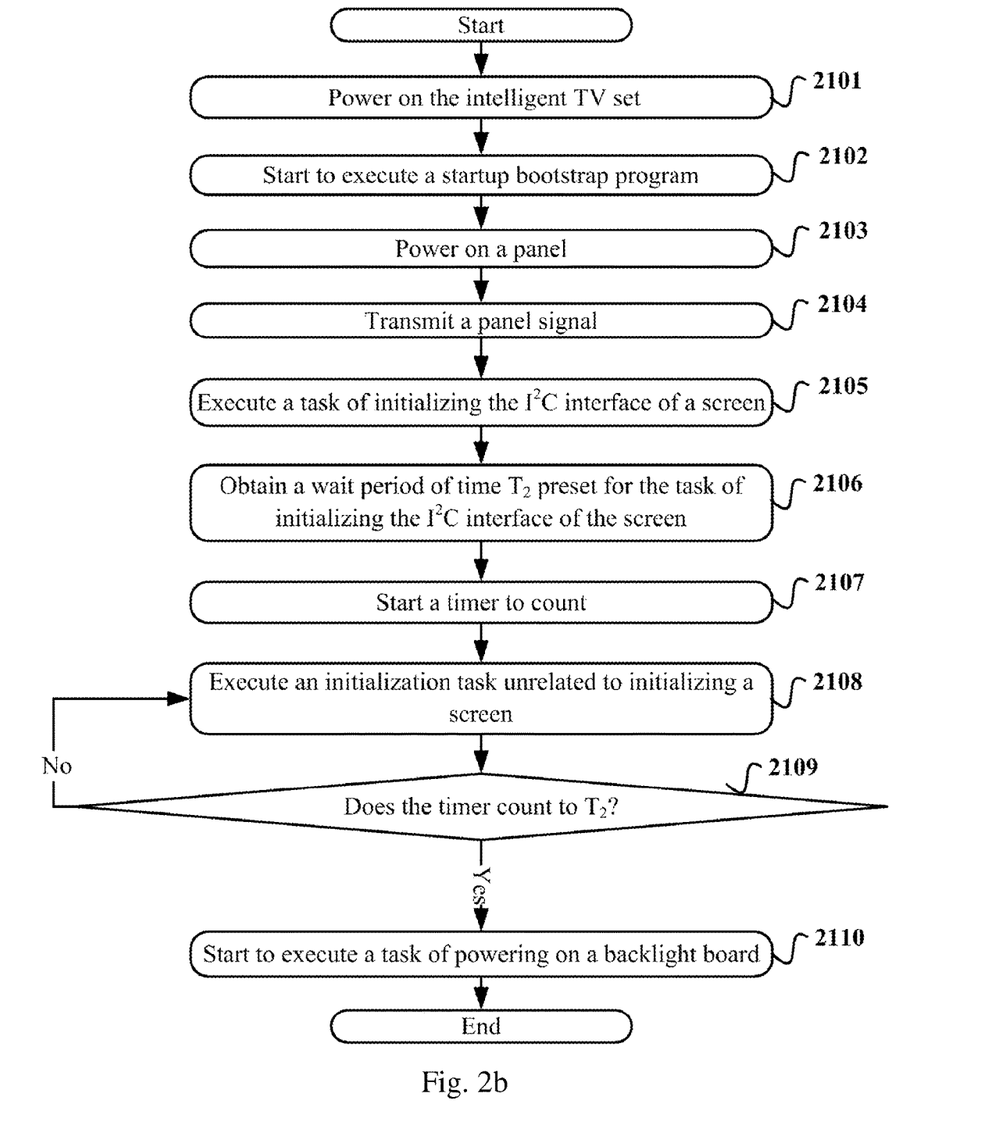
FIG. 2b is a schematic flow chart of another method for controlling a startup bootstrap program, applicable to an intelligent TV set including an I²C interface, according to some embodiments of the disclosure.
Figure 2C:
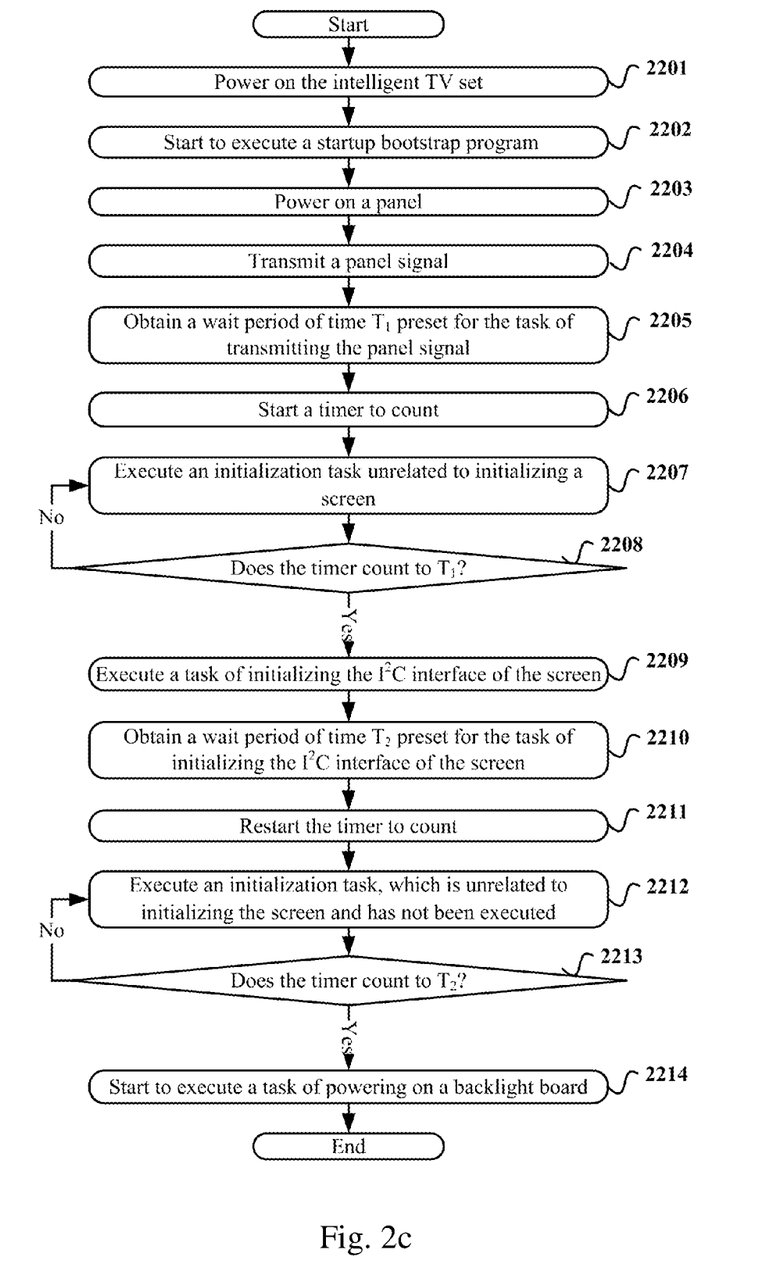
FIG. 2c is a schematic flow chart of another method for controlling a startup bootstrap program, applicable to an intelligent TV set including an I²C interface, according to some embodiments of the disclosure.
Figure 3:
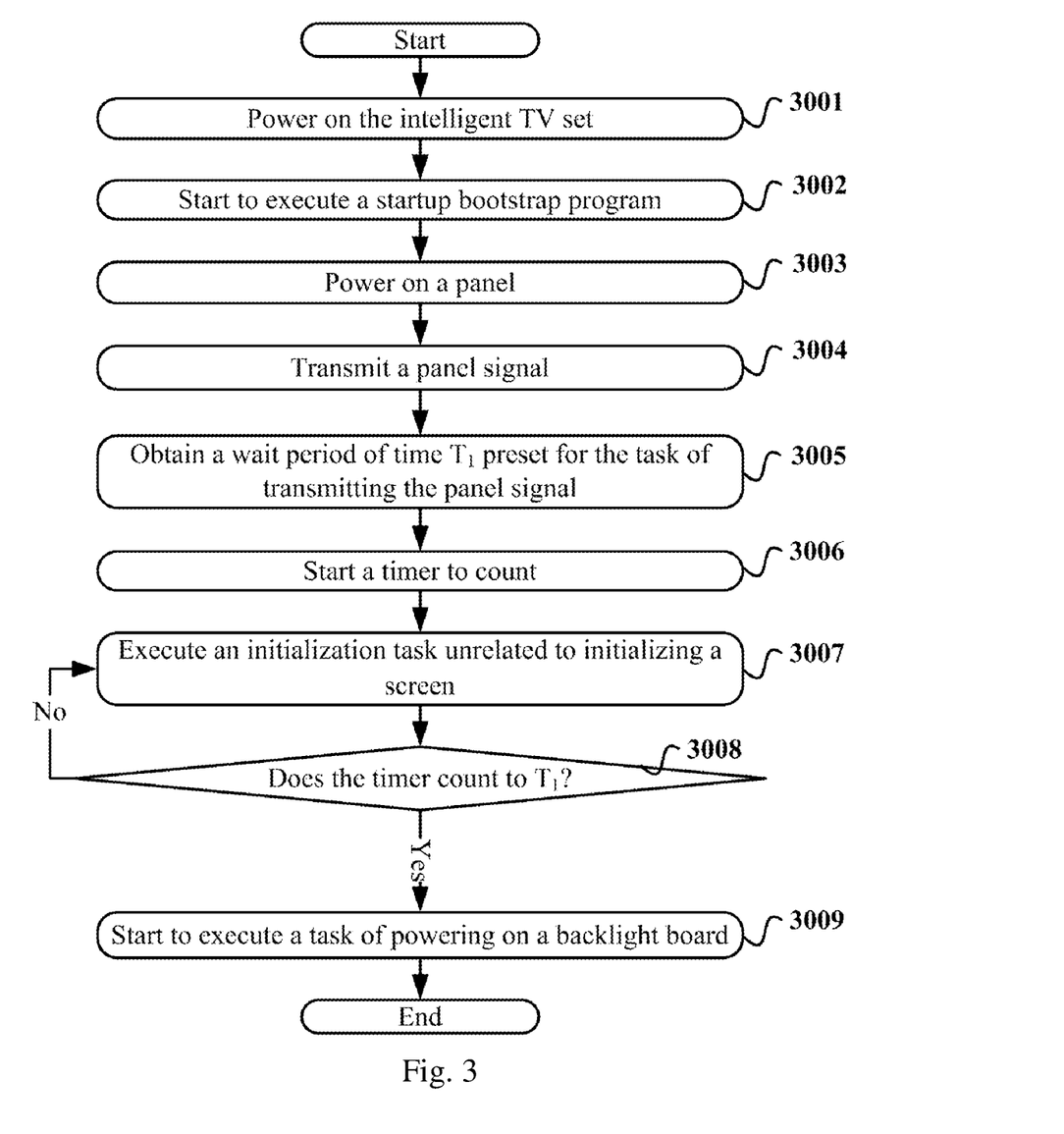
FIG. 3 is a schematic flow chart of a method for controlling a startup bootstrap program, applicable to an intelligent TV set without I²C interface, according to some embodiments of the disclosure.

FIG. 2a illustrates a schematic flow chart of a method for controlling a startup bootstrap program, applicable to an intelligent TV set including an $I^2C$ interface, according to some embodiments of the disclosure, FIG. 2b is a schematic flow chart of another method for controlling a startup bootstrap program, applicable to an intelligent TV set including an $I^2C$ interface, according to some embodiments of the disclosure, and FIG. 2c is a schematic flow chart of still another method for controlling a startup bootstrap program, applicable to an intelligent TV set including an $I^2C$ interface, according to some embodiments of the disclosure. Also FIG. 3 illustrates a schematic flow chart of a method for controlling a startup bootstrap program, applicable to an intelligent TV set without $I^2C$ interface, according to some embodiments of the disclosure.

Referring to FIG. 2a, some embodiments of the disclosure provide a solution to controlling a startup bootstrap program, applicable to an intelligent TV set including an $I^2C$ interface.

The step 2001 is to power on the intelligent TV set.

The step 2002 is to start to execute a startup bootstrap program (Uboot) of initializing pieces of software/hardware.

The step 2003 is to start to execute a task of powering on a panel.

The step 2004 is to start to execute a task of transmitting a panel signal.

The step 2005 is to obtain a wait period of time $T_1$ preset for the task of transmitting the panel signal. Generally $T_1 \geq 500$ ms.

The step 2006 is to start a timer to count.

The step 2007 is to execute an initialization task unrelated to initializing a screen.

The step 2008 is, after the currently executed initialization task unrelated to initializing the screen is finished, to determine whether the timer counts to the wait period of time $T_1$ preset for the task of transmitting the panel signal, and if so, to proceed to the step 2009; otherwise, to proceed to the step 2007, that is to say a next initialization task unrelated to initializing the screen is further executed.

The step 2009 is to execute a task of initializing the $I^2C$ interface of the screen.

The step 2010 is to start to execute a task of powering on a backlight board.

In the embodiments above of the disclosure, the respective tasks of initializing the screen by the screen in the process of the startup bootstrap program can be further executed in a preset state machine mechanism:

Firstly after the intelligent TV set is powered on, the screen of the intelligent TV set enters a state of waiting for initializing the panel.

Secondly after the step 2002 is performed, and before the step 2003 is performed, the current state of the screen is detected, and if the current state of the screen is the state of waiting for initializing the panel, then the flow will proceed to the step 2003 and the step 2004, and after the step 2004 is performed, the flow will enter a state of waiting for initializing the $I^2C$ interface.

Then while the step 2008 is being performed, if the timer has counted to the wait period of time $T_1$ preset for the task of transmitting the panel signal, then the current state of the screen will be detected again, and if the current state of the screen is the state of waiting for initializing the $I^2C$ interface, then the flow will proceed to the step 2009, and after the step 2009 is performed, then the flow will enter a state of waiting for initializing the backlight board.

Next after the step 2009 is performed, and before the step 2010 is performed, the current state of the screen is detected again, and if the current state of the screen is the state of waiting for initializing the backlight board, then the flow will proceed to the step 2010.

In this way, in the embodiments of the disclosure, the respective tasks in the process of the startup bootstrap program of the intelligent TV set are executed in the state machine mechanism, so that the screen can be initialized smoothly while shortening the overall time for startup boot.

Of course, in the embodiments of the disclosure, if there is an initialization task, which is unrelated to initializing the screen, and which has not been executed, after the step 2010 is performed, then the initialization task which has not been executed will be further executed.

Referring to FIG. 2b, some embodiments of the disclosure provide another solution to controlling a startup bootstrap program, applicable to an intelligent TV set including an I$^2$C interface.

The step 2101 is to power on the intelligent TV set.

The step 2102 is to start to execute a startup bootstrap program (Uboot) of initializing pieces of software/hardware.

The step 2103 is to start to execute a task of powering on a panel.

The step 2104 is to start to execute a task of transmitting a panel signal.

The step 2105 is to execute a task of initializing the I$^2$C interface of a screen.

The step 2106 is to obtain a wait period of time $T_2$ preset for the task of initializing the I$^2$C interface of the screen. Generally $T_2 \geq 500$ ms.

The step 2107 is to start a timer to count.

The step 2108 is to execute an initialization task unrelated to initializing the screen.

The step 2109 is, after the currently executed initialization task unrelated to initializing the screen is finished, to determine whether the timer counts to a wait period of time $T_1$ preset for the task of transmitting the panel signal, and if so, to proceed to the step 2110; otherwise, to proceed to the step 2108, that is to say, a next initialization task unrelated to initializing the screen is further executed.

The step 2110 is to start to execute a task of powering on a backlight board.

In some embodiments above of the disclosure, the respective tasks of initializing the screen by the screen in the process of the startup bootstrap program of the intelligent TV set can be further executed in a preset state machine mechanism:

Firstly after the intelligent TV set is powered on, the screen of the intelligent TV set enters a state of waiting for initializing the panel.

Secondly after the step 2102 is performed, and before the step 2103 is performed, the current state of the screen is detected, and if the current state of the screen is the state of waiting for initializing the panel, then the flow will proceed to the step 2103 and the step 2104, and after the step 2104 is performed, the flow will enter a state of waiting for initializing the I$^2$C interface.

Then after the step 2104 is performed, and before the step 2105 is performed, the current state of the screen is detected again, and if the current state of the screen is the state of waiting for initializing the I$^2$C interface, then the flow will proceed to the step 2105, and after the step S2105 is performed, the flow will enter the state of waiting for initializing a backlight board.

Next while the step 2106 is being performed, if the timer has counted to the wait period of time $T_2$ preset for the task of initializing the I$^2$C interface of the screen, then the current state of the screen will be detected again, and if the current state of the screen is the state of waiting for initializing the backlight board, then the flow will proceed to the step 2110, and after the step 2109 is performed, then the flow will enter a state of waiting for initializing the backlight board.

In this way, in the embodiments of the disclosure, the respective tasks in the process of the startup bootstrap program of the intelligent TV set are executed in the state machine mechanism, so that the screen can be initialized smoothly while shortening the overall time for startup boot.

Of course, in the embodiments of the disclosure, if there is an initialization task, which is unrelated to initializing the screen, and which has not been executed, after the step 2110 is performed, then the initialization task which has not been executed will be further executed.

Referring to FIG. 2c, some embodiments of the disclosure provide a further solution to controlling a startup bootstrap program, applicable to an intelligent TV set including an I$^2$C interface.

The step 2201 is to power on the intelligent TV set.

The step 2202 is to start to execute a startup bootstrap program (Uboot) of initializing pieces of software/hardware.

The step 2203 is to start to execute a task of powering on a panel.

The step 2204 is to start to execute a task of transmitting a panel signal.

The step 2205 is to obtain a wait period of time $T_1$ preset for the task of transmitting the panel signal. Generally $T_1 \geq 500$ ms.

The step 2206 is to start a timer to count.

The step 2207 is to execute an initialization task unrelated to initializing the screen.

The step 2208 is, after the currently executed initialization task unrelated to initializing the screen is finished, to determine whether the timer counts to the wait period of time $T_1$ preset for the task of transmitting the panel signal, and if so, to proceed to the step 2209; otherwise, to proceed to the step 2207, that is to say, a next initialization task unrelated to initializing the screen is further executed.

The step 2209 is to start to execute a task of initializing the I$^2$C interface of a screen.

The step 2210 is to obtain a wait period of time $T_2$ preset for the task of initializing the I$^2$C interface of the screen. Generally $T_2 \geq 500$ ms.

The step 2211 is to restart the timer to count.

The step 2212 is to execute an initialization task, which is unrelated to initializing the screen, and which has not been executed.

The step 2213 is, after the currently executed initialization task unrelated to initializing the screen is finished, to determine whether the timer counts to the wait period of time $T_2$ preset for the task of initializing the I$^2$C interface of the screen, and if so, to proceed to the step 2214; otherwise, to proceed to the step 2212, that is to say, a next initialization task unrelated to initializing the screen is further executed.

The step 2214 is to start to execute a task of powering on a backlight board.

In some embodiments above of the disclosure, the respective tasks of initializing the screen by the screen in the process of the startup bootstrap program of the intelligent TV set can be further executed in a preset state machine mechanism:

Firstly after the intelligent TV set is powered on, the screen of the intelligent TV set enters a state of waiting for initializing the panel.

Secondly after the step 2202 is performed, and before the step 2203 is performed, the current state of the screen is detected, and if the current state of the screen is the state of waiting for initializing the panel, then the flow will proceed to the step 2203 and the step 2204, and after the step 2204 is performed, the flow will enter a state of waiting for initializing the I²C interface.

Then while the step 2208 is being performed, if the timer has counted to the wait period of time $T_1$ preset for the task of transmitting the panel signal, then the current state of the screen will be detected again, and if the current state of the screen is the state of waiting for initializing the I²C interface, then the flow will proceed to the step 2209, and after the step 2209 is performed, then the flow will enter a state of waiting for initializing the backlight board; and if the current state of the screen is the state of waiting for initializing the backlight board, then the flow will proceed to the step 2214.

Next while the step 2213 is being performed, if the timer has counted to the wait period of time $T_2$ preset for the task of initializing the I²C interface of the screen, then the current state of the screen will be detected again, and if the current state of the screen is the state of waiting for initializing the I²C interface, then the flow will proceed to the step 2209, and after the step 2209 is performed, then the flow will enter a state of waiting for initializing the backlight board; and if the current state of the screen is the state of waiting for initializing the backlight board, then the flow will proceed to the step 2214.

In this way, in the embodiments of the disclosure, the respective tasks in the process of the startup bootstrap program of the intelligent TV set are executed in the state machine mechanism, so that the screen can be initialized smoothly while shortening the overall time for startup boot.

Of course, in the embodiments of the disclosure, if there is an initialization task, which is unrelated to initializing the screen, and which has not been executed, after the step 2214 is performed, then the initialization task which has not been executed will be further executed.

Referring to FIG. 3, some embodiments of the disclosure provide a solution to controlling a startup bootstrap program, applicable to an intelligent TV set including no I²C interface.

The step 3001 is to power on the intelligent TV set.

The step 3002 is to start to execute a startup bootstrap program (Uboot) of initializing pieces of software/hardware.

The step 3003 is to start to execute a task of powering on a panel.

The step 3004 is to start to execute a task of transmitting a panel signal.

The step 3005 is to obtain a wait period of time $T_1$ preset for the task of transmitting the panel signal. Generally $T_1 \geq 500$ ms.

The step 3006 is to start a timer to count.

The step 3007 is to execute an initialization task unrelated to initializing a screen.

The step 3008 is, after the currently executed initialization task unrelated to initializing the screen is finished, to determine whether the timer counts to the wait period of time $T_1$ preset for the task of transmitting the panel signal, and if so, to proceed to the step 3009; otherwise, to proceed to the step 3007, that is to say, a next initialization task unrelated to initializing the screen is further executed.

The step 3009 is to start to execute a task of powering on a backlight board.

In the embodiments above of the disclosure, the respective tasks of initializing the screen by the screen in the process of the startup bootstrap program can be further executed in a preset state machine mechanism:

Firstly after the intelligent TV set is powered on, the screen of the intelligent TV set enters a state of waiting for initializing the panel.

Secondly after the step 3002 is performed, and before the step 3003 is performed, the current state of the screen is detected, and if the current state of the screen is the state of waiting for initializing the panel, then the flow will proceed to the step 3003 and the step 3004, and after the step 3004 is performed, the flow will enter a state of waiting for initializing the backlight board.

Then while the step 3008 is being performed, if the timer has counted to the wait period of time $T_1$ preset for the task of transmitting the panel signal, then the current state of the screen will be detected again, and if the current state of the screen is the state of waiting for initializing the backlight board, then the flow will proceed to the step 3009.

In this way, in the embodiments of the disclosure, the respective tasks in the process of the startup bootstrap program of the intelligent TV set are executed in the state machine mechanism, so that the screen can be initialized smoothly while shortening the overall time for startup boot.

Of course, in the embodiments of the disclosure, if there is an initialization task, which is unrelated to initializing the screen, and which has not been executed, after the step 3009 is performed, then the initialization task which has not been executed will be further executed.

It shall be noted that in the embodiments above of the disclosure, the initialization tasks unrelated to initializing the screen can include but will not be limited to a task of detecting an upgrade, a task of loading the kernel, a task of starting the kernel, a task of executing StartKernel, although a repeated description thereof will be omitted here.

Figure 4:
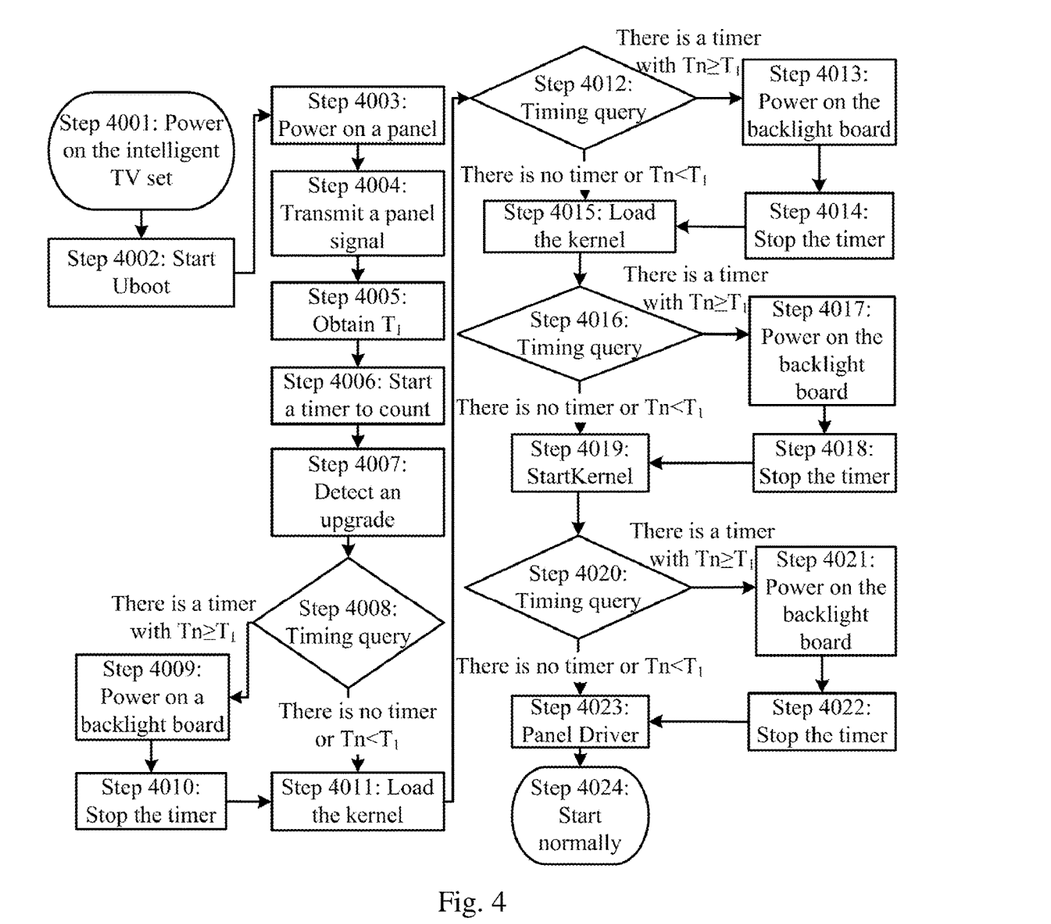
FIG. 4 is a schematic flow chart of a startup booting process according to some embodiments of the disclosure.

Based upon the same technical idea, some embodiments of the disclosure further provide a detailed flow of a solution to controlling a startup bootstrap program, and FIG. 4 illustrates a schematic flow chart of a startup bootstrap program according to some embodiments of the disclosure. As illustrated in FIG. 4, the flow can particularly include the following steps:

The step 4001 is to power on the intelligent TV set.

The step 4002 is to start to execute a startup bootstrap program (Uboot) of initializing pieces of software/hardware.

The step 4003 is to start to execute a task of powering on a panel.

The step 4004 is to start to execute a task of transmitting a panel signal.

The step 4005 is to obtain a wait period of time $T_1$ preset for the task of transmitting the panel signal. Generally $T_1 \geq 500$ ms.

The step 4006 is to start a timer to count.

The step 4007 is to start to execute a task of detecting an upgrade.

The step 4008 is, after the task of detecting an upgrade is finished, to determine whether there is a started timer which has recorded a period of time Tn counting to the wait period of time $T_1$ preset for the task of transmitting the panel signal, and if $Tn \geq T_1$, to proceed to the step 4009; if there is no started timer, to proceed to the step 4011; and if $Tn \leq T_1$, to proceed to the step 4011.

The step 4009 is to start to execute a task of powering on a backlight board.

The step 4010 is to stop the timer.

The step 4011 is to start to execute a task of loading a kernel.

The step 4012 is, after the task of the loading the kernel is finished, to determine whether there is a started timer which has recorded a period of time Tn counting to the wait period of time $T_1$ preset for the task of transmitting the panel signal, and if $Tn \geq T_1$, to proceed to the step 4013; if there is no started timer, to proceed to the step 4015; and if $Tn < T_1$, to proceed to the step 4015.

The step 4013 is to start to execute a next task of initializing a screen.

The step 4014 is to stop the timer. In a state machine, and the task of powering on the backlight board is executed before disabling the timer, thus ending the flow.

The step 4015 is to start to execute a task of starting the kernel.

The step 4016 is, after the task of starting the kernel is finished, to determine whether there is a started timer which has recorded a period of time Tn counting to the wait period of time $T_1$ preset for the task of transmitting the panel signal, and if $Tn \geq T_1$, to proceed to the step 4017; if there is no started timer, to proceed to the step 4019; and if $Tn < T_1$, to proceed to the step 4019.

The step 4017 is to start to execute a task of powering on the backlight board.

The step 4018 is to stop the timer.

The step 4019 is to start to execute the StartKernel task.

The step 4020 is, after the task of executing the StartKernel task is finished, to determine whether there is a started timer which has recorded a period of time Tn counting to the wait period of time $T_1$ preset for the task of transmitting the panel signal, and if $Tn \geq T_1$, to proceed to the step 4021; if there is no started timer, to proceed to the step 4023; and if $Tn < T_1$, to proceed to the step 4023.

The step 4021 is to start to execute a task of powering on the backlight board.

The step 4022 is to stop the timer.

The step 4023 is to start to execute a Panel Driver task.

The step 4024 is to start the system normally, that is, to further execute a task which has not been executed in the startup bootstrap program.

It shall be noted that in the embodiments of the disclosure, all the steps 4007, 2011, 2015, and 2019 are tasks unrelated to initializing the screen, and all the task of powering on the panel, the task of transmitting the panel signal, and the task of powering on the backlight board are tasks related to initializing the screen. As can be apparent, several tasks unrelated to initializing the screen, and tasks related to initializing the screen have been listed in the embodiments of the disclosure merely by way of an example, where the tasks unrelated to initializing the screen are executed while executing the tasks related to initializing the screen. In a real application, there may be other further tasks unrelated to initializing the screen as long as the respective tasks can be finished without any influence upon each other in the embodiments of the disclosure.

It shall be further noted that in the embodiments of the disclosure, if the period of time Tn recorded by the timer is less than $T_1$, then it will be further determined whether $T_1-Tn > T_Q$, where $T_Q$ represents a preset threshold, and if so, then a next task unrelated to initializing the screen will be further executed, because typically the order of magnitude of a period of time it takes to execute a task unrelated to initializing the screen is far lower than the order of magnitude of a period of time it takes to execute a task related to initializing the screen; if $T_1-Tn < T_Q$, then execution of the task of powering on the backlight board will be started, and the timer will be stopped. Here although the period of time recorded by the timer has not reached the wait period of time $T_1$ preset for the task of transmitting the panel signal, if $T_Q$ is set sufficiently small, then the currently remaining period of time will not be sufficient to further execute a task unrelated to initializing the screen, so the wait period of time $T_1$ preset for the task of transmitting the panel signal will arrive after waiting for only a very short period of time. In the embodiments of the disclosure, the period of time it takes to load the startup bootstrap program can be shortened as much as possible while ensuring the total length of time required for executing the second tasks not to be smaller than the total length of time required for executing the first tasks.

In the embodiments above, the process of initializing the screen in the startup bootstrap program of the intelligent TV set does not include any process of initializing the $I^2C$ interface, but in a real application, the process of initializing the $I^2C$ interface may be required in the process of initializing the screen in the startup bootstrap program of some intelligent TV set, for example, if the hardware of the screen can support a 1080 display, then the intelligent TV set may further regulate the screen using internal software to support both a 1080 display and a 720P display, and in this case, the $I^2C$ interface needs to be further initialized while the screen is being initialized, so that a display effect of the screen can be further regulated in response to a demand of the user, a network factor, etc. In view of this, the flow of the startup bootstrap program for the screen including the $I^2C$ interface can be further controlled using the same technical idea in the embodiments of the disclosure particularly as described above, so a repeated description thereof will be omitted here.

In the embodiments of the disclosure, a state machine configured to control the screen to be initialized can be introduced to the flow of the startup bootstrap program, so that it can be determined, by detecting the different states of the screen, whether the current task to be executed is a task of initializing the screen, or another initialization task unrelated to initializing the screen.

It shall be noted that if all the initialization tasks unrelated to initializing the screen have been finished, and at this time the timer has not counted to the wait period of time which is obtained in advance, then the flow will further wait until the timer counts to the wait period of time which is obtained in advance. If the timer has counted to the wait period of time which is obtained in advance, then the flow will operate according to the state indicator of the state machine, or further execute a part or all of the other initialization tasks unrelated to initializing the screen.

In a real application, the timer according to an embodiment of the disclosure can be a counter which can convert a result of counting into a result of timing under a preset rule, which is the temporal difference between the time when the timer starts timing, and the current time. Of course, in an embodiment of the disclosure, a specified timer can also be used to count directly the temporal difference between the time when the timer is started, and the current time. All of the two timing modes above, and other timing modes, applicable to the solution to controlling a startup bootstrap program according to the embodiments of the disclosure shall fall into the scope of the disclosure, so a repeated description thereof will be omitted here.

As can be apparent from the technical solution above, the embodiments of the disclosure provide a solution to controlling a startup bootstrap program of an intelligent TV set, where the startup bootstrap program is executed by firstly executing a first task of initializing the screen, and then executing a second initialization task unrelated to initializing the screen while waiting for the execution of the first task. Thus it can be seen, in the embodiments of the disclosure, in order to shorten the overall time for startup boot, the other initialization task unrelated to initializing the screen can be performed while waiting for the execution of the first task of initializing the screen, thus shortening the time it takes to load the startup bootstrap program while initializing the screen normally.

Figure 5:
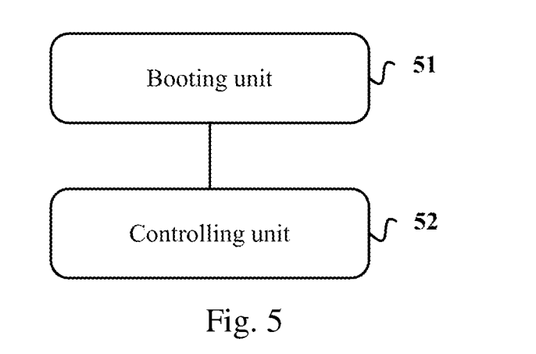
FIG. 5 is a schematic structural diagram of an apparatus for controlling a startup bootstrap program of an intelligent TV set according to some embodiments of the disclosure.

Based upon the same technical idea, some embodiments of the disclosure further provide an apparatus for controlling a startup bootstrap program of an intelligent TV set, and FIG. 5 illustrates a schematic structural diagram of an apparatus for controlling a startup bootstrap program of an intelligent TV set according to some embodiments of the disclosure. As illustrated in FIG. 5, the apparatus includes:

A booting unit 51 is configured, after a system is powered on, to execute a first task of initializing a screen in a startup bootstrap program, and to obtain the length of preset time required for executing the first task, where the startup bootstrap program is a bootstrap program for initializing pieces of software/hardware of the system; and A controlling unit 52 is configured to execute a second initialization task unrelated to initializing the screen in the startup bootstrap program while the first task is being executed.

Here the total length of time for executing the second initialization tasks unrelated to initializing the screen is no less than the total length of time required for executing the first tasks.

The controlling unit 52 is configured:

To execute a task of initializing a panel; to execute a task of transmitting a panel signal carrying image data of the initialization of the system; while starting executing the task of transmitting the panel signal, to start a preset timer, and to execute a second initialization task unrelated to initializing the screen; after the timer counts to the obtained length of time required for executing the task of transmitting the panel signal, to execute a task of initializing an I²C interface of the screen; and to execute a task of initializing a backlight board.

The controlling unit 52 is configured:

To execute a task of initializing a panel; to execute a task of transmitting a panel signal carrying image data of the initialization of the system; to execute a task of initializing an I²C interface of the screen; while starting executing the task of initializing an I²C interface of the screen, to start a preset timer, and to execute a second initialization task unrelated to initializing the screen; and after the timer counts to the obtained length of time required for executing the task of initializing the I²C interface of the screen, to execute a task of initializing a backlight board.

The controlling unit 52 is configured:

To execute a task of initializing a panel; to execute a task of transmitting a panel signal carrying image data of the initialization of the system; while starting executing the task of transmitting the panel signal, to start a preset timer, and to execute a second initialization task unrelated to initializing the screen; after the timer counts to the obtained length of time required for executing the task of transmitting the panel signal, to execute a task of initializing an I²C interface of the screen; while starting executing the task of initializing an I²C interface of the screen, to restart the preset timer, and to execute a second initialization task, which is unrelated to initializing the screen and has not been executed; and after the timer counts to the obtained length of time required for executing the task of initializing the I²C interface of the screen, to execute a task of initializing a backlight board.

The controlling unit 52 is configured:

To execute a task of initializing a panel; to execute a task of transmitting a panel signal carrying image data of the initialization of the system; while starting executing the task of transmitting the panel signal, to start a preset timer, and to execute a second initialization task unrelated to initializing the screen; and after the timer counts to the obtained length of time required for executing the task of transmitting the panel signal, to execute a task of initializing a backlight board.

Figure 6:
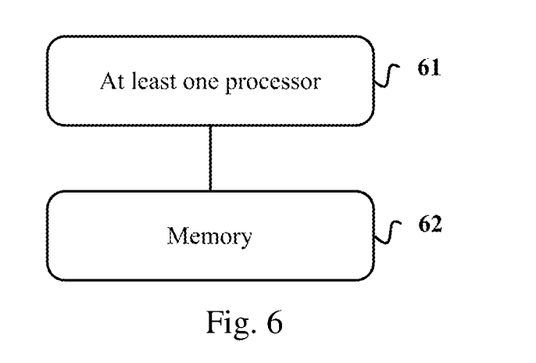
FIG. 6 is a schematic structural diagram of another apparatus for controlling a startup bootstrap program of an intelligent TV set according to some embodiments of the disclosure.

Based upon the same inventive idea, some embodiments of the disclosure further provide an apparatus for controlling a startup bootstrap program of an intelligent TV set, and as illustrated in FIG. 6, the apparatus includes:

At least one processor 61; and a memory 62, where the memory 62 stores therein instructions executable by the at least one processor 61, and the instructions are executed by the at least one processor 61 to enable the at least one processor 61:

After a system is powered on, to execute a first task of initializing a screen in a startup bootstrap program, and to obtain the length of preset time required for executing the first task, where the startup bootstrap program is a bootstrap program for initializing pieces of software/hardware of the system; and To execute a second initialization task unrelated to initializing the screen in the startup bootstrap program while the first task is being executed.

Here the total length of time for executing the second initialization tasks unrelated to initializing the screen is no less than the total length of time required for executing the first tasks.

The at least one processor 61 is configured to execute a task of initializing a panel; to execute a task of transmitting a panel signal carrying image data of the initialization of the system; while starting executing the task of transmitting the panel signal, to start a preset timer, and to execute a second initialization task unrelated to initializing the screen; after the timer counts to the obtained length of time required for executing the task of transmitting the panel signal, to execute a task of initializing an I²C interface of the screen; and to execute a task of initializing a backlight board.

The at least one processor 61 is configured to execute a task of initializing a panel; to execute a task of transmitting a panel signal carrying image data of the initialization of the system; to execute a task of initializing an I²C interface of the screen; while starting executing the task of initializing an I²C interface of the screen, to start a preset timer, and to execute a second initialization task unrelated to initializing the screen; and after the timer counts to the obtained length of time required for executing the task of initializing the I²C interface of the screen, to execute a task of initializing a backlight board.

The at least one processor 61 is configured to execute a task of initializing a panel; to execute a task of transmitting a panel signal carrying image data of the initialization of the system; while starting executing the task of transmitting the panel signal, to start a preset timer, and to execute a second initialization task unrelated to initializing the screen; after the timer counts to the obtained length of time required for executing the task of transmitting the panel signal, to execute a task of initializing an I²C interface of the screen; while starting executing the task of initializing an I²C interface of the screen, to restart the preset timer, and to execute a second initialization task, which is unrelated to initializing the screen and has not been executed; and after the timer counts to the obtained length of time required for executing the task of initializing the I²C interface of the screen, to execute a task of initializing a backlight board.

The at least one processor 61 is configured to execute a task of initializing a panel; to execute a task of transmitting a panel signal carrying image data of the initialization of the system; while starting executing the task of transmitting the panel signal, to start a preset timer, and to execute a second initialization task unrelated to initializing the screen; and after the timer counts to the obtained length of time required for executing the task of transmitting the panel signal, to execute a task of initializing a backlight board.

An embodiment of the disclosure further provides a non-transitory machine-readable storage medium storing therein computer executable instructions including instructions for performing the method above for controlling a startup bootstrap program of an intelligent TV set.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for controlling a startup bootstrap program of an intelligent TV set, the method comprising:
   after a system is powered on, executing a first task of initializing a screen in a startup bootstrap program, and obtaining the length of preset time required for executing the first task, wherein the startup bootstrap program is a bootstrap program for initializing pieces of software/hardware of the system; and
   executing a second initialization task unrelated to initializing the screen in the startup bootstrap program while the first task is being executed.

2. The method according to claim 1, wherein the respective tasks in the process of the startup bootstrap program are executed sequentially in the steps of:
   executing a task of initializing a panel;
   executing a task of transmitting a panel signal carrying image data of the initialization of the system; and starting a preset timer while starting executing the task of transmitting the panel signal, and executing a second initialization task unrelated to initializing the screen;
   after the timer counts to the obtained length of time required for executing the task of transmitting the panel signal, executing a task of initializing an I²C interface of the screen; and
   executing a task of initializing a backlight board.

3. The method according to claim 1, wherein the respective tasks in the process of the startup bootstrap program are executed sequentially in the steps of:
   executing a task of initializing a panel;
   executing a task of transmitting a panel signal carrying image data of the initialization of the system;
   executing a task of initializing an I²C interface of the screen; and starting a preset timer while starting executing the task of initializing an I²C interface of the screen, and executing a second initialization task unrelated to initializing the screen; and
   after the timer counts to the obtained length of time required for executing the task of initializing the I²C interface of the screen, executing a task of initializing a backlight board.

4. The method according to claim 1, wherein the respective tasks in the process of the startup bootstrap program are executed sequentially in the steps of:
   executing a task of initializing a panel;
   executing a task of transmitting a panel signal carrying image data of the initialization of the system; and starting a preset timer while starting executing the task of transmitting the panel signal, and executing a second initialization task unrelated to initializing the screen;
   after the timer counts to the obtained length of time required for executing the task of transmitting the panel signal, executing a task of initializing an I²C interface of the screen;
   restarting the preset timer while starting executing the task of initializing an I²C interface of the screen, and executing a second initialization task, which is unrelated to initializing the screen and has not been executed; and
   after the timer counts to the obtained length of time required for executing the task of initializing the I²C interface of the screen, executing a task of initializing a backlight board.

5. The method according to claim 1, wherein the respective tasks in the process of the startup bootstrap program are executed sequentially in the steps of:
   executing a task of initializing a panel;
   executing a task of transmitting a panel signal carrying image data of the initialization of the system; and starting a preset timer while starting executing the task of transmitting the panel signal, and executing a second initialization task unrelated to initializing the screen; and
   after the timer counts to the obtained length of time required for executing the task of transmitting the panel signal, executing a task of initializing a backlight board.

6. The method according to claim 1, wherein the total length of time for executing the second initialization tasks unrelated to initializing the screen is no less than the total length of time required for executing the first tasks.

7. An apparatus for controlling a startup bootstrap program of an intelligent TV set, the apparatus comprising: at least one processor; and a memory, wherein the memory stores therein instructions executable by the at least one processor, and the instructions are executed by the at least one processor to enable the at least one processor:
   after a system is powered on, to execute a first task of initializing a screen in a startup bootstrap program, and to obtain the length of preset time required for executing the first task, wherein the startup bootstrap program is a bootstrap program for initializing pieces of software/hardware of the system; and
   to execute a second initialization task unrelated to initializing the screen in the startup bootstrap program while the first task is being executed.

8. The apparatus according to claim 7, wherein the at least one processor is configured:
   to execute a task of initializing a panel; to execute a task of transmitting a panel signal carrying image data of the initialization of the system; to start a preset timer while starting executing the task of transmitting the panel signal, and to execute a second initialization task unrelated to initializing the screen; after the timer counts to the obtained length of time required for executing the task of transmitting the panel signal, to execute a task of initializing an I²C interface of the screen; and to execute a task of initializing a backlight board.

9. The apparatus according to claim 7, wherein the at least one processor is configured:
   to execute a task of initializing a panel; to execute a task of transmitting a panel signal carrying image data of the initialization of the system; to execute a task of initializing an I²C interface of the screen; to start a preset timer while starting executing the task of initializing an I²C interface of the screen, and to execute a second initialization task unrelated to initializing the screen; and after the timer counts to the obtained length of time required for executing the task of initializing the I²C interface of the screen, to execute a task of initializing a backlight board.

10. The apparatus according to claim 7, wherein the at least one processor is configured:
    to execute a task of initializing a panel; to execute a task of transmitting a panel signal carrying image data of the initialization of the system; to start a preset timer while starting executing the task of transmitting the panel signal, and to execute a second initialization task unrelated to initializing the screen; after the timer counts to the obtained length of time required for executing the task of transmitting the panel signal, to execute a task of initializing an I²C interface of the screen; to restart the preset timer while starting executing the task of initializing an I²C interface of the screen, and to execute a second initialization task, which is unrelated to initializing the screen and has not been executed; and after the timer counts to the obtained length of time required for executing the task of initializing the I²C interface of the screen, to execute a task of initializing a backlight board.

11. The apparatus according to claim 7, wherein the at least one processor is configured:
    to execute a task of initializing a panel; to execute a task of transmitting a panel signal carrying image data of the initialization of the system; to start a preset timer while starting executing the task of transmitting the panel signal, and to execute a second initialization task unrelated to initializing the screen; and after the timer counts to the obtained length of time required for executing the task of transmitting the panel signal, to execute a task of initializing a backlight board.

12. The apparatus according to claim 7, wherein the total length of time for executing the second initialization tasks unrelated to initializing the screen is no less than the total length of time required for executing the first tasks.

13. A non-transitory machine-readable storage medium, storing therein computer executable instructions comprising instructions for performing the steps of:
    after a system is powered on, executing a first task of initializing a screen in a startup bootstrap program, and obtaining the length of preset time required for executing the first task, wherein the startup bootstrap program is a bootstrap program for initializing pieces of software/hardware of the system; and
    executing a second initialization task unrelated to initializing the screen in the startup bootstrap program while the first task is being executed.

14. The non-transitory machine-readable storage medium according to claim 13, wherein the computer executable instructions comprise instructions for performing the steps of:
    executing a task of initializing a panel;
    executing a task of transmitting a panel signal carrying image data of the initialization of the system; and starting a preset timer while starting executing the task of transmitting the panel signal, and executing a second initialization task unrelated to initializing the screen;
    after the timer counts to the obtained length of time required for executing the task of transmitting the panel signal, executing a task of initializing an I²C interface of the screen; and
    executing a task of initializing a backlight board.

15. The non-transitory machine-readable storage medium according to claim 13, wherein the computer executable instructions comprise instructions for performing the steps of:
    executing a task of initializing a panel;
    executing a task of transmitting a panel signal carrying image data of the initialization of the system;
    executing a task of initializing an I²C interface of the screen; and starting a preset timer while starting executing the task of initializing an I²C interface of the screen, and executing a second initialization task unrelated to initializing the screen; and after the timer counts to the obtained length of time required for executing the task of initializing the I²C interface of the screen, executing a task of initializing a backlight board.

16. The non-transitory machine-readable storage medium according to claim 13, wherein the computer executable instructions comprise instructions for performing the steps of:

executing a task of initializing a panel;

executing a task of transmitting a panel signal carrying image data of the initialization of the system; and starting a preset timer while starting executing the task of transmitting the panel signal, and executing a second initialization task unrelated to initializing the screen;

after the timer counts to the obtained length of time required for executing the task of transmitting the panel signal, executing a task of initializing an I²C interface of the screen; restarting the preset timer while starting executing the task of initializing an I²C interface of the screen, and executing a second initialization task, which is unrelated to initializing the screen, and has not been executed; and after the timer counts to the obtained length of time required for executing the task of initializing the I²C interface of the screen, executing a task of initializing a backlight board.

17. The non-transitory machine-readable storage medium according to claim 13, wherein the computer executable instructions comprise instructions for performing the steps of:

executing a task of initializing a panel;

executing a task of transmitting a panel signal carrying image data of the initialization of the system; and starting a preset timer while starting executing the task of transmitting the panel signal, and executing a second initialization task unrelated to initializing the screen; and after the timer counts to the obtained length of time required for executing the task of transmitting the panel signal, executing a task of initializing a backlight board.

18. The non-transitory machine-readable storage medium according to claim 13, wherein the total length of time for executing the second initialization tasks unrelated to initializing the screen is no less than the total length of time required for executing the first tasks.

* * * * *